United States Patent
Roddy et al.

(10) Patent No.: US 7,784,542 B2
(45) Date of Patent: *Aug. 31, 2010

(54) CEMENT COMPOSITIONS COMPRISING LATEX AND A NANO-PARTICLE AND ASSOCIATED METHODS

(75) Inventors: Craig W. Roddy, Duncan, OK (US); Jiten Chatterji, Duncan, OK (US); Roger Cromwell, Walters, OK (US); Rahul Chandrakant Patil, Pune (IN); Abhijit Tarafdar, Pune (IN); Abhimanyu Deshpande, Pune (IN); Christopher Lynn Gordon, Oklahoma City, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/472,561

(22) Filed: May 27, 2009

(65) Prior Publication Data

US 2009/0236097 A1   Sep. 24, 2009

Related U.S. Application Data

(63) Continuation-in-part of application No. 12/426,645, filed on Apr. 20, 2009, which is a continuation-in-part of application No. 11/747,002, filed on May 10, 2007, now Pat. No. 7,559,369.

(51) Int. Cl.
 *E21B 33/138* (2006.01)
 *E21B 33/14* (2006.01)
 *C09K 8/467* (2006.01)

(52) U.S. Cl. .............. 166/293; 106/717; 106/737; 106/815; 106/816; 106/819; 166/295; 507/269; 507/271; 507/273; 507/906; 523/130; 524/2; 524/8; 977/963

(58) Field of Classification Search .............. None
See application file for complete search history.

(56) References Cited

U.S. PATENT DOCUMENTS

| | | | |
|---|---|---|---|
| 2,805,719 A | 9/1957 | Anderson | |
| 4,047,567 A | 9/1977 | Childs | |
| 4,274,881 A | 6/1981 | Langton et al. | |
| 4,321,243 A | 3/1982 | Cornwell et al. | |
| RE31,190 E | 3/1983 | Detroit | |
| 4,385,935 A | 5/1983 | Skjeldal | |
| 4,455,169 A | 6/1984 | Chatterji | |
| 4,555,269 A | 11/1985 | Rao | |
| RE32,742 E | 9/1988 | Skjeldal | |
| 4,935,060 A | 6/1990 | Dingsoyr | |
| 4,961,790 A | 10/1990 | Smith | |
| 5,125,455 A | 6/1992 | Harris et al. | |
| 5,127,955 A | 7/1992 | Fry | |
| 5,149,370 A | 9/1992 | Olaussen | |
| 5,207,832 A | 5/1993 | Baffreau et al. | |
| 5,355,954 A | 10/1994 | Onan | |
| 5,373,901 A | 12/1994 | Norman | |
| 5,398,758 A | 3/1995 | Onan | |
| 5,518,996 A | 5/1996 | Maroy | |
| 5,769,939 A | 6/1998 | Dingsoyr | |
| 5,783,541 A | 7/1998 | Tack | |
| 5,820,670 A * | 10/1998 | Chatterji et al. | ............. 106/737 |
| 6,153,562 A | 11/2000 | Villar | |
| 6,227,294 B1 | 5/2001 | Chatterji | |
| 6,444,316 B1 | 9/2002 | Reddy | |
| 6,488,764 B2 | 12/2002 | Westerman | |
| 6,527,051 B1 | 3/2003 | Reddy | |
| 6,554,071 B1 | 4/2003 | Reddy | |
| 6,722,433 B2 | 4/2004 | Brothers et al. | |
| 6,808,561 B2 | 10/2004 | Genge | |
| 6,978,834 B1 | 12/2005 | Chatterji | |
| 6,982,000 B2 | 1/2006 | Chatterji | |
| 6,983,800 B2 | 1/2006 | Chatterji | |
| 6,989,057 B2 | 1/2006 | Getzlaf | |
| 7,013,998 B2 | 3/2006 | Ray | |
| 7,032,664 B2 | 4/2006 | Lord | |
| 7,033,975 B2 | 4/2006 | Baran | |

(Continued)

FOREIGN PATENT DOCUMENTS

| | | |
|---|---|---|
| DE | 102007042078 | 3/2009 |
| WO | WO 97/49644 | 12/1997 |
| WO | WO 2009030758 | 3/2009 |

OTHER PUBLICATIONS

PCT International Searching Authority for International Application No. PCT/GB2009/002596 dated Feb. 8, 2010.

(Continued)

*Primary Examiner*—George Suchfield
(74) *Attorney, Agent, or Firm*—Craig W. Roddy; Tumey, LLP

(57) ABSTRACT

Methods and compositions are provided that may comprise cement, a nano-particle, latex, and water. An embodiment of the present invention includes a method of cementing in a subterranean formation. The method may include introducing a cement composition into the subterranean formation, wherein the cement composition comprises cement, a nano-particle, latex, and water. The method further may include allowing the cement composition to set in the subterranean formation. Another embodiment of the present invention include a cement composition. The cement composition may comprise cement, a nano-particle, latex, and water.

36 Claims, No Drawings

U.S. PATENT DOCUMENTS

| | | | |
|---|---|---|---|
| 7,036,592 | B2 | 5/2006 | Nguyen |
| 7,081,489 | B2 | 7/2006 | Chen |
| 7,086,466 | B2 | 8/2006 | Roddy |
| 7,087,554 | B2 | 8/2006 | Youngson |
| 7,156,174 | B2 | 1/2007 | Roddy |
| 7,178,590 | B2 | 2/2007 | Vargo |
| 7,204,312 | B2 | 4/2007 | Roddy |
| 7,213,646 | B2 | 5/2007 | Roddy |
| 7,559,369 | B2 * | 7/2009 | Roddy et al. ............. 166/280.2 |
| 2002/0073894 | A1 | 6/2002 | Genge et al. |
| 2003/0220204 | A1 | 11/2003 | Baran et al. |
| 2005/0167105 | A1 | 8/2005 | Roddy |
| 2006/0075932 | A1 | 4/2006 | Lecolier |
| 2006/0086503 | A1 | 4/2006 | Reddy et al. |
| 2006/0162926 | A1 | 7/2006 | Roddy |
| 2006/0166834 | A1 | 7/2006 | Roddy |
| 2006/0177661 | A1 | 8/2006 | Smith et al. |
| 2006/0217463 | A1 | 9/2006 | Lecolier |
| 2006/0254466 | A1 | 11/2006 | Drochon |
| 2006/0260513 | A1 | 11/2006 | Porro Guiterrez et al. |
| 2006/0289163 | A1 | 12/2006 | Lecolier |
| 2007/0015668 | A1 | 1/2007 | Harrower et al. |
| 2007/0056732 | A1 | 3/2007 | Roddy et al. |
| 2008/0058229 | A1 | 3/2008 | Berkland et al. |
| 2008/0242769 | A1 | 10/2008 | Birgisson et al. |
| 2008/0277116 | A1 | 11/2008 | Roddy et al. |
| 2009/0124522 | A1 | 5/2009 | Roddy |
| 2009/0139719 | A1 | 6/2009 | Luo et al. |
| 2009/0260544 | A1 | 10/2009 | Roddy et al. |
| 2010/0016183 | A1 | 1/2010 | Roddy et al. |
| 2010/0025039 | A1 | 2/2010 | Roddy et al. |
| 2010/0075874 | A1 | 3/2010 | Perera Mercado et al. |
| 2010/0095871 | A1 | 4/2010 | Patil et al. |

OTHER PUBLICATIONS

Konstantin Sobelev and Miguel Ferrada-Gutierrez, Nanotechnology of Concrete (printed from Internet Feb. 20, 2007).
Amer. Assoc. of Hwy. And Transportation Officials, ASTM Designation C42-94, Std. Test for Obtaining and Testing Drilled Cores & Sawed Beams of Concrete, pp. 24-27, 1994.
ASTM Designation C496-96, Standard Test Method for Splitting Tensile Strength of Cylindrical Specimens, pp. 265-268, 1996.
API Specification 10: Materials and Testing for Well Cements, pp. 7, 19-30, 1990.
Industrial Specialities, "Basic Know-How About Silica", 2002 Eka Chemicals found at http://www.colloidalsilica.com/htmlfiles/7_1asp.
Industrial Specialities, "The Cementing Tool", 2002 Eka Chemicals found at http://www.colloidalsilica.com/htmlfiles/1_3_3.asp.
Cembinder W, "Deepwater Cementing", Eka Chemicals and Akzo Nobel, Jun. 2006.
Material Safety Data Sheet by Nyacol Nano Technologies, Inc., "Nyacol Nyasil 5" dated Sep. 6, 2001 and "Nyacol Nyasil 20" dated May 17, 2001.
Halliburton Fluid Systems, Cementing SSA-2, Coarse Silica Flour, H02026, Feb. 2007.
Zonal Isolation Technology, SSA-1 Strength-Stabilizing Agent, H01340, 1998 Halliburton Energy Services, Inc.
Halliburton Zonal Isolation "Shear Bond Testing", Specialized Testing 434.030, Global Laboratory Best Practices, Vo. 4, Mar. 2000.
Jerzy Chrusciel and Ludomir Slusarski, Synthesis of Nanosilica by the Sol-Gel Method and its Activity Toward Polymers, Materials Science, vol. 21, Nov. 4, 2003, pp. 461-469.
Halliburton Fluid Systems, Cementing, Silicalite, Cement Additive, H01484, Jul. 2006.
Halliburton Fluid Systems, Cementing, GasCon 469, Cement Additive, H01485, May 2006.
Halliburton Fluid Systems, Cementing, MICROSAND Cement Additive, H01460, Apr. 2007.
Nyacol Nano Technologies, Inc., Silica Additives, Sep. 1998.
Nyacol Nano Technologies, Inc., NexSil Aqueous Colloidal Silica, Nov. 2005.
Nyacol Nano Technologies, Inc., NexSil Silicon Wafer Polishing Slurries NexSil 3500, 6000, 5000 and 5000HP, May 2005.
OSHA and ANSI, Material Safety Data Sheet, Silicon Nanopowder, Oct. 2006.
Alfa Aesar A Johnson Matthew Company, Search Result Pages for "Nano", Apr. 25, 2007.
Konstantin Sobolev, NSF Workshop on Nanomodification of Cementitious Materials: Portland Cement Concrete and Asphalt Concrete, "Nanomodification of Cement", Aug. 2006.
Cardenas and Struble, Electrokinetic Nanoparticle Treatment of Hardened Cement Paste for Reduction of Permeability, Journal of Materials in Civil Eng. @ASCE, Aug. 2006, pp. 554-560.
Dan Mueller and Ramy Eid, Characterizing Early-State Physical Properties, Mechanical Behavior of Cement Designs, Drilling Contractor, Jun. 2006, pp. 50-52.
International Search Report and Written Opinion dated Aug. 20, 2008, for PCT/GB2008/001524.
Roy, Della M., New Strong Cement Materials: Chemically Bonded Ceramics, Downloaded from www.sciencemag.org on Jul. 29, 2008, pp. 651-658, Feb. 6, 1987, XP-002490242.
Dillenbeck, Robert L. III, The Effect of Microsilica on the Thermal Stability of Lightweight Cement Systems, Society of Petroleum Engineers, pp. 116-1-116-5, 1990,XP-002490243.
Flores-Velez, Characterization & Properties of Portland Cement Composites Incorp. Zinc-Iron Oxide Nanoparticles, Journal of Materials Science, pp. 983-988, 2002, XP-002490244.
Physical Properties of Elkem Microsilica, at http://www.refractories.elkem.com (printed from the Internet on Mar. 5, 2009).
Wikipedia, Nanoparticle, at http://en.wikipedia.org/wiki/Nanoparticle (printed from the Internet on Mar. 9, 2009).
Rieker et al., Particle Size Distribution Inferred from Small-Angle X-ray Scattering and Transmission Electron Microscopy, Langmuir, 1999, pp. 638-641.
Hashimoto et al., Particle size distribution analysis for nano-SiO2 powder by ultra-small angle X-ray scattering (USAXS) using synchrotron radiation, ASS, 2005, pp. 227-230.
Office Action from U.S. Appl. No. 11/747,002 dated Apr. 2, 2008.
Office Action from U.S. Appl. No. 11/747,002 dated May 27, 2008.
Office Action from U.S. Appl. No. 11/747,002 dated Jul. 10, 2008.
Office Action from U.S. Appl. No. 11/747,002 dated Oct. 21, 2008.
Office Action from U.S. Appl. No. 11/747,002 dated Dec. 22, 2008.
Office Action from U.S. Appl. No. 11/747,002 dated Mar. 3, 2009.
Office Action dated May 5, 2010 from U.S. Appl. No. 12/426,645.
PCT International Search Report and Written Opinion for International Application No. PCT/GB2010/000485 dated May 21, 2010.
USPTO Notice of Allowance for U.S. Appl. No. 12/426,645 dated Jun. 23, 2010.
"Effect of Nano-SiO2 on heat of hydration of portland cement," Xu et al., Nanjing Gongye Daxue Xuebao, Ziran Kexeuban (2007), 29(4), 45-48, abstract only.
"Application of nanometer silica in inorganic nonmetallic materials," Deng et al., Taoci (Xiangyang China) 2007, (9), 8-12, abstract only.
"Reaction mechanism analyses of cement based composite materials modified by nano-silica," Xu et al., Kuangye Gongcheng (Changsha, China), 2007, 27(3), 99-102, abstract only.
"Research on Reinforcement of cement composites and relevant mechanism," Yu et al., Qiangdoa Keji Daxue Xuebao, Ziran Kexueban (2006), 27(2), 148-151, abstract only.
"Antagonistic Effect of superplasticizer and colloidal nanosilica in the hydration of Alite and Belite pastes," Bjoernstrom et al., Journal of Materials Science, 2007, 42(11), 3901-3907, abstract only.
"Nano-concrete: possibilities and challenges," Balaguru et al., RILEM Proceedings (2005), PRO 45 (2nd Int'l Symposium on Nanotechnology in construction (NICOM2), 2005, 233-243, abstract only.
"A comparative study on the pozzolanic activity between nano-SiO2 and silica fume," Ye et al., Journal of Wuhan Univ of Technology, Mat'ls Science Edition (2006), 21(3), 153-157, abstract only.
"Optimization of silica fume, fly ash and amorphous nano-silica in superplasticized high-performance concrete," Collepardi et al., American Concrete Institute, SP 2004, SP-221 (Eight CANMET/

ACI International Conference on Fly Ash, Silica Fume, Slag, and Natrural Pozzolans in Concrete, 2004), 495-505, abstract only.

"Accelerating effects of colloidal nano-silica for beneficial calcium-silicate-hydrate formation in cement," Bjornstrom et al., Chemical Physics Letters (2004), 392 (1-3), 242-248, abstract only.

"Experimental study on cement-based composites with nano-SiO2," Feng et al., Cailiao Kexue Yu Gongcheng Zuebao Bianjibu (2004), 22(2), 224-227.

"Strong and bioactive composites containing nano-silica-fused whiskers for bone repair," Xu et al., Biomaterials (2004), 25(19), 4615-4626, abstract only.

Research on properties of Portland cement added with nano-SiO2, Wang et al., RILEM Proceedings (2003), PRO 32 (International Conference on Advances in Concrete and Structures, 2003, vol. 1), 154-161, abstract only.

"Comparison on properties of high strength concrete with nano-SiO2 and silica fume added," Ye et al., Jianzhu Cailiao Xuebao (2003), 6(4), 381-385, abstract only.

"Study on compound effect of silica fume and nano-SiOx for cementing composite materials," Tang et al., Guisuanyan Xuebao (2003), 3(5), 523-527, abstract only.

"Effect of nano-SiOx and silica fume on cement paste water demand," Li et al., Shenyang Jianzhu gongcheng Xueyuan Xuebao, Ziran Kexueban (2002), 18(4), 278-281, abstract only.

"Hydration reaction between C3S and fly ash, silica fume, nano-SiO2, and microstructure of hydrated pastes," Ba et al., Guisuanyan Xuebao (2002), 30(6), 780-784, abstract only.

"Nano-silica - an additive for high-strength concrete," Wagner et al., Wissenschaftliche Zeitschrift - Hoschule fuer Architektur and Bauwesen Weimar - Universitaet (1994), 40 (5/6/7), 183-87, abstract only.

"Investigations on the preparation and mechanical properties of the nano-alumina reinforced cement composite," Li et al., Materials Letters (2006), 0(3), 356-359, abstract only.

"Effect of secondary interface microstructure on pore structure and performance of cement-based materials," Feng et al., Cailiao Yanjiu Xuebao (2003), 17(5), 489-494, abstract only.

"Preparation of multifunctional dry-power paints," Yanmin Gao, Faming Zhuanli Shenqing gongkai Shuomingshu, 4 pages, 2005, abstract only.

USPTO office action from U.S. Appl. No. 12/426,393, dated Jul. 2, 2010.

* cited by examiner

CEMENT COMPOSITIONS COMPRISING LATEX AND A NANO-PARTICLE AND ASSOCIATED METHODS

CROSS-REFERENCE TO RELATED APPLICATIONS

The present application is a continuation in part of U.S. patent application Ser. No. 12/426,645, filed on Apr. 20, 2009, entitled "Well Treatment Compositions and Methods Utilizing Nano-Particles," which is a continuation in part of U.S. patent application Ser. No. 11/747,002, filed on May 10, 2007, entitled "Well Treatment Compositions and Methods Utilizing Nano-Particles," the entire disclosures of which are incorporated herein by reference.

BACKGROUND

The present invention relates to well treatment compositions and methods utilizing nano-particles. More particularly, in certain embodiments, the present invention includes cement compositions and methods of cementing in a subterranean formation that comprise cement, a nano-particle, latex, and water.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing and the placement of cement plugs.

In operation, the annular sheath of cement formed between the well bore and the pipe string often suffers structural failure due to pipe movements which cause shear stresses to be exerted on the set cement. Such stress conditions are commonly the result of relatively high fluid pressures and/or temperatures inside the cemented pipe string during testing, perforating, fluid injection or fluid production. For example, such stress may occur in wells subjected to steam recovery or production of hot formation fluids from high-temperature formations. The high-internal pipe pressure and/or temperature can result in the expansion of the pipe string, both radially and longitudinally, which places stresses on the cement sheath causing the cement bond between the exterior surfaces of the pipe or the well bore walls, or both, to fail and thus allow leakage of formation fluids and so forth. Accordingly, it may be desirable for the cement composition utilized for cementing pipe strings in the well bores to develop high strength after setting and to have sufficient resiliency (e.g., elasticity and ductility) to resist loss of the cement bond between the exterior surfaces of the pipe or the well bore walls, or both. Also, it may be desirable for the cement composition to be able to resist cracking and/or shattering that may result from other forces on the cement sheath. For example, it may be desirable for the cement sheath to include structural characteristics that protect its structural integrity from forces associated with formation shifting, overburden pressure, subsidence, tectonic creep, pipe movements, impacts and shocks subsequently generated by drilling and other well operations.

Heretofore, latex has been included in cement compositions for use in subterranean formations to improve various properties of the compositions. For example, latex may be included in a cement composition for fluid loss control, to provide resiliency to the set cement, and/or to reduce the issues associated with gas channeling. In general, latex used in cement compositions may be provided as a water-in-oil emulsion containing high quantities of natural or synthetic rubber (such as styrene-butadiene rubber). However, latex-containing cement compositions typically may have reduced strength with respect to comparable cement compositions. In addition, latex-containing cement compositions typically may have slower strength development as well.

SUMMARY

The present invention relates to well treatment compositions and methods utilizing nano-particles. More particularly, in certain embodiments, the present invention includes cement compositions and methods of cementing in a subterranean formation that comprise cement, a nano-particle, latex, and water.

An embodiment of the present invention includes a method of cementing in a subterranean formation. The method may comprise introducing a cement composition into the subterranean formation, wherein the cement composition comprises cement, a nano-particle, latex, and water. The method further may comprise allowing the cement composition to set in the subterranean formation.

Another embodiment of the present invention includes a method of cementing in a subterranean formation. The method may comprise introducing a cement composition into a space between the subterranean formation and a conduit disposed in the subterranean formation. The cement composition may comprise cement, nano-silica, latex, and water. The nano-silica may have a particle in the range of about 1 nm to about 100 nm. The nano-silica may be present in an amount in the range of about 0.01% to about 10% by weight of the cement on a dry basis. The method further may comprise allowing the cement composition to set in the space.

Yet another embodiment of the present invention includes a cement composition. The cement composition may comprise cement, a nano-particle, latex, and water.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to well treatment compositions and methods utilizing nano-particles. More particularly, in certain embodiments, the present invention includes cement compositions and methods of cementing in a subterranean formation that comprise cement, a nano-particle, latex, and water. There may be several potential advantages to the methods and compositions of the present invention, only some of which may be alluded to herein. One of the many advantages of the present invention is that inclusion of nano-particles in latex-containing cement compositions may improve the mechanical properties of the cement composition. By way of example, inclusion of nano-silica may provide improved strength development as well as providing increased compressive strength for latex-containing cement compositions.

An exemplary embodiment of the cement compositions of the present invention comprises cement, a nano-particle, and water. In certain embodiments, cement compositions of the present invention further may comprise latex. Those of ordinary skill in the art will appreciate that the exemplary cement compositions generally should have a density suitable for a particular application. By way of example, the cement composition may have a density in the range of from about 4 pounds per gallon ("ppg") to about 20 ppg. In exemplary embodiments, the cement compositions may have a density in the range of from about 8 ppg to about 17 ppg. Exemplary embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Exemplary embodiments of the cement compositions of the present invention comprise a cement. Any of a variety of cements suitable for use in subterranean cementing operations may be used in accordance with exemplary embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements, and combinations thereof. In certain embodiments, the hydraulic cement may comprise a Portland cement. The Portland cements that may be suited for use in exemplary embodiments of the present invention are classified as Class A, C, H and G cements according to American Petroleum Institute, *Recommended Practice for Testing Well Cements*, API Specification 10B-2 (ISO 10426-2), First edition, July 2005. In certain embodiments, the hydraulic cement and/or the cement composition may be essentially free of calcined serpentine. The reaction product from the calcination of serpentine may include forsterite, a polymorph of enstatite, an amorphous material, or a combination thereof.

Embodiments of the cement compositions of the present invention further comprise a nano-particle. Examples of suitable nano-particles include nano-silica, nano-alumina, nano-zinc oxide, nano-boron, nano-iron oxide, nano-calcium carbonate, nano-clays, and combinations thereof. In certain embodiments, the nano-particles may be provided as a colloidal suspension in a base fluid. By way of example, colloidal silica may be utilized in embodiments of the present invention. In other embodiments, the nano-particles may be provided in a dry form. While the nano-particles may include nano-silica, it should be understood that the cement composition may comprise less than about 25% silica by weight of cement on a dry basis ("bwoc"), in accordance with embodiments of the present invention. Furthermore, it should be understood that the nano-silica may be essentially free of silica fume, in accordance with embodiments of the present invention.

Generally, the nano-particle is defined as having a particle size of less than or equal to about 100 nanometers ("nm"). As used herein, "particle size" refers to volume surface mean diameter ("$D_S$") which is related to the specific surface area. Volume surface mean diameter may be defined by the following formula: $D_S=6/(\Phi_S A_w \rho_p)$ where $\Phi_S$=sphericity; $A_w$=Specific surface area and $\rho_p$=Particle density. It should be understood that the particle size of the nano-particle may vary based on the measurement technique, sample preparation, and sample conditions (e.g., temperature, concentration, etc.). One technique for measuring particle size of the nano-particle at room temperature (approx. 80° F.) includes dispersing the nano-particle in a suitable solvent (such as chloroform, dichloroethane, acetone, methanol, ethanol, water, etc.) by sonification and proper dilution. A dispersing agent may be used to deagglomerate the nano-particles, if needed. The diluted, dispersed solution may then be placed on a carbon-coated copper grid with 300 mesh size by using a micropipette. It may then be dried and examined by Transmission electron microscopy (TEM). The particle size distribution may be obtained with high accuracy using an appropriate computation technique. By way of example, TEM image processing may use image-processing software such as Image-Pro® Plus software from Media Cybernetics to determine the particle size. Another example technique involves use of calibrated drawing tools in Digital Micrograph software followed by statistical analysis of the data with Kaleida-Graph software to determine the particle size.

In certain embodiments, the nano-particle may have a particle size in the range of from about 1 nm to about 100 nm (about $1\times10^{-9}$ m to about $100\times10^{-9}$ m). In certain exemplary embodiments, the nano-particle may have a particle size of less than or equal to about 50 nm. For example, the nano-particle may have a particle size in the range of from about 5 nm to about 50 nm. In further exemplary embodiments, the nano-particle may have a particle size of less than or equal to about 30 nm. For example, the nano-particle may have a particle size in the range of from about 5 nm to about 30 nm. In certain embodiments, the nano-particle may comprise colloidal silica having a particle size in the range of from about 5 nm to about 20 nm. However, it should be noted that the particular nano-particle chosen may be used in combination with differently sized particles of the same material, in accordance with present embodiments. For example, where nano-silica is used, silica with particle sizes greater than 100 nm may be included in a cement composition in accordance with present embodiments.

It is now recognized that the nano-particles utilized with present embodiments, may have an impact on certain physical characteristics of the latex-containing cement compositions. For example, relative to latex-containing cement compositions that do not contain nano-particles, inclusion of nano-silica (e.g., colloidal nano-silica) in the cement composition may provide improved mechanical properties. By way of example, the nano-silica may provide for more rapid strength development as well as increased compressive strength. Accordingly, a cement composition in accordance with present embodiments may comprise a sufficient amount of the nano-particle (e.g., nano-silica) to provide the desired characteristics in a resulting cement. In exemplary embodiments, the nano-particles may be present in the cement composition in an amount in the range of from about 0.01% to about 10% bwoc). In exemplary embodiments, the nano-particles may be present in the cement composition in an amount in the range of from about 0.01% to about 3% bwoc and, alternatively from about 0.01% to about 1.5% bwoc. It should be understood that the concentrations of the nanoparticles are provided based on the dry weight of the nanoparticle.

Moreover, embodiments of the cement compositions of the present invention also may comprise a latex. As will be understood by those skilled in the art, the latex may comprise any of a variety of rubber materials that are commercially available in latex form. Suitable rubber materials include natural rubber (e.g., cis-1,4-polyisoprene), modified natural rubber, synthetic rubber, and combinations thereof. Synthetic rubber of various types may be utilized, including ethylene-propylene rubbers, styrene-butadiene rubbers, nitrile rubbers, nitrile butadiene rubbers, butyl rubber, neoprene rubber, polybutadiene rubbers, acrylonitrile-styrene-butadiene rubber, polyisoprene rubber, and AMPS-styrene-butadiene rubber, combinations thereof. As used herein, the term "AMPS" refers to 2-acrylamido-2-methylpropanesulfonic acid or salts thereof. In certain embodiments, the synthetic rubber may comprise AMPS in an amount ranging from about 7.5% to about 10%, styrene in an amount ranging from about 30% to about 70% and butadiene in an amount ranging from about 30% to about 70%. Examples of suitable AMPS-styrene-butadiene rubbers are described in more detail in U.S. Pat. Nos. 6,488,764 and 6,184,287, the entire disclosures of which are incorporated herein by reference. Those of ordinary skill in the art will appreciate that other types of synthetic rubbers are also encompassed within the present invention.

In certain embodiments, the latex comprises a water-in-oil emulsion that comprises styrene-butadiene rubber. As will be appreciated, the aqueous phase of the emulsion comprises an aqueous colloidal dispersion of the styrene-butadiene copolymer. Moreover, in addition to the dispersed styrene-butadiene copolymer, the emulsion may comprise water in the range of from about 40% to about 70% by weight of the emulsion and small quantities of an emulsifier, polymerization catalysts, chain modifying agents, and the like. As will be appreciated, styrene-butadiene latex is often produced as a terpolymer emulsion that may include a third monomer to assist in stabilizing the emulsion. Non-ionic groups which exhibit stearic effects and which contain long ethoxylate or hydrocarbon tails also may be present.

In accordance with embodiments of the present invention, the weight ratio of the styrene to the butadiene in the latex may range from about 10:90 to about 90:10. In some embodiments, the weight ratio of the styrene to the butadiene in the emulsion may range from about 20:80 to about 80:20. An example of a suitable styrene-butadiene latex has a styrene-to-butadiene weight ratio of about 25:75 and comprises water in an amount of about 50% by weight of the emulsion. Such a styrene-butadiene latex is available from Halliburton Energy Services, Duncan, Okla., under the name Latex 2000™ cement additive. Another example of a suitable styrene-butadiene latex has a styrene-to-butadiene weight ratio of about 30:70.

The latex may generally be provided in the cement compositions of the present invention in an amount sufficient for the desired application. In some embodiments, the latex may be included in the cement compositions in an amount in the range of from about 5% to about 45% bwoc. In exemplary embodiments, the latex may be included in the cement compositions in an amount in the range of from about 5% to about 20% bwoc. It should be understood that the concentrations of the latex is provided based on the amount of the aqueous latex that may be used.

The water used in exemplary embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In exemplary embodiments, the water may be present in the cement compositions in an amount in the range of from about 33% to about 200% bwoc. In exemplary embodiments, the water may be present in an amount in the range of from about 35% to about 70% bwoc.

Embodiments of the cement compositions of the present invention also may comprise a latex stabilizer. Among other things, the latex stabilizer may be included in embodiments of the cement compositions for preventing the cement compositions from prematurely coagulating. Suitable latex stabilizers may include a surfactant or combination of surfactants for preventing the premature inversion of the latex emulsion. Examples of suitable latex stabilizers include, but are not limited to, sulfonates and sulfates. Additional examples of suitable latex stabilizing surfactants which are suitable for this purpose may have the formula R-Ph-O $(OCH_2CH_2)_m$OH where R contains an alkyl group of from about 5 to about 30 carbon atoms, Ph contains a phenyl group, and m is an integer having value between 5 to 50. An example of a surfactant of this formula is ethoxylated nonylphenyl containing in the range of about 20 to about 30 moles of ethylene oxide. Another example of a suitable surfactant is a salt having the formula $R_1(R_2O)_nSO_3X$ where $R_1$ contains an alkyl group having 5 to 20 carbon atoms, $R_2$ contains the group —$CH_2$—$CH_2$—, n is an integer having value in between 10 to 40, and X is any suitable cation. An example of surfactant of this formula is the sodium salt of a sulfonated compound derived by reacting a $C_{12-15}$ alcohol with about 15 moles of ethylene oxide having the formula $H(CH_2)_{12-15}(CH_2CH_2O)_{15}SO_3Na$. Specific examples of suitable latex stabilizers include Stabilizer 434B™ latex stabilizer, Stabilizer 434C™ latex stabilizer, and Stabilizer 434D™ latex stabilizer, which are available from Halliburton Energy Services, Inc. While embodiments of the present invention encompass a wide variety of different latex stabilizers and amounts thereof that may be included in the cement compositions of the present invention depending on the particular latex used and other factors, the latex stabilizer may be included in embodiments of the cement compositions in an amount in the range of about 0% to about 30% by weight of the aqueous latex in the cement composition and, alternatively, about 10% to about 20% by weight.

Other additives suitable for use in subterranean cementing operations also may be added to embodiments of the cement compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, a fluid loss control additive, dispersants, defoaming agents, foaming agents, thixotropic additives, and combinations thereof. By way of example, the cement composition may be a foamed cement composition further comprising a foaming agent and a gas. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

An example of a cement composition of the present invention comprises Portland Class H cement, nano-particle silica having a particle size of about 18 nm and present in an amount of about 0.3% to about 0.7% bwoc, aqueous latex present in an amount of about 9% to about 15% bwoc and comprising styrene-butadiene rubber, and water. By way of further example, the aqueous latex may contain AMPS-styrene-butadiene rubber rather than the styrene-butadiene rubber. Additional additives may include a defoaming agent (such as D-AIR 3000L™ defoamer), a latex stabilizer (such as Stabilizer 434B™ latex stabilizer), a cement set retarder (such as HR-6L retarder), and a cement dispersant (such as CFR-3L dispersant).

An example of a cement composition of the present invention comprises Portland Class H cement, nano-particle silica having a particle size of about 6 nm and present in an amount of about 0.2% to about 0.45% bwoc, aqueous latex present in an amount of about 9% to about 15% bwoc and comprising styrene-butadiene rubber, and water. By way of further example, the aqueous latex may contain AMPS-styrene-butadiene rubber rather than the styrene-butadiene rubber. Additional additives may include a defoaming agent (such as D-AIR 3000L™ defoamer), a latex stabilizer (such as Stabilizer 434B™ latex stabilizer), a cement set retarder (such as HR-6L retarder), and a cement dispersant (such as CFR-3L dispersant).

As will be appreciated by those of ordinary skill in the art, exemplary embodiments of the cement compositions of the present invention may be used in a variety of subterranean applications, including primary and remedial cementing. Exemplary embodiments of the cement compositions may be introduced into a subterranean formation and allowed to set therein. Exemplary embodiments of the cement compositions may comprise cement, water and a nano-particle. In certain embodiments, the cement compositions further may comprise a latex. By way of example, in exemplary primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in exemplary remedial cementing embodiments, a cement composition may be used, for example, in squeeze-cementing operations or in the placement of cement plugs. One or more hydrocarbons (e.g., oil, gas, etc.) may be produced from a well bore penetrating the subterranean formation.

While the preceding discussion is directed to the use of nano-particles in well cementing methods, those of ordinary skill in the art will appreciate that the present technique also encompasses the use of nano-particles in any of a variety of different subterranean treatments. For example, the nano-particles may be included in any of a number of well treatment fluids that may be used in subterranean treatments, including drilling fluids, completion fluids, stimulation fluids and well clean-up fluids. In accordance with another embodiment, the nano-particles may be included as proppant in a well treatment fluid. For example, a well treatment fluid containing the nano-particles may be introduced into a subterranean formation at or above a pressure sufficient to create or enhance one or more fractures in the subterranean formation. Enhancing a fracture includes enlarging a pre-existing fracture in the formation. At least a portion of the nano-particles may be deposited in the one or more fractures such that the fractures are prevented from fully closing upon the release of pressure, forming conductive channels through which fluids may flow to (or from) the well bore.

In addition to the use of the nano-particles without encapsulation, embodiments of the present invention may include encapsulation of the nano-particles to facilitate transportation and incorporation of the nano-particles in well treatment fluids (e.g., cement compositions). Specifically, encapsulation of the nano-particles in accordance with present embodiments may include enclosing the nano-particles within an outer coating or container in particulate form. Exemplary methods of encapsulation are set forth in U.S. Pat. Nos. 5,373,901; 6,444,316; 6,527,051; 6,554,071; 7,156,174; and 7,204,312, the relevant disclosures of which are incorporated herein by reference.

Various types of encapsulation may be employed such that the nano-particles are contained but retain their particulate nature and, thus, retain their corresponding impact on physical properties of cement slurries. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Exemplary water-dissolvable materials that may be utilized to encapsulate the nano-particles are described in U.S. Pat. Nos. 4,961,790 and 5,783,541, the relevant disclosures of which are incorporated herein by reference.

In accordance with exemplary embodiments, the cement compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

The present embodiments may include a combination of at least three features to obtain a maximum packing volume fraction. One is the use of at least three particulate materials wherein the at least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. In accordance with present embodiments, the first particulate material includes at least one of nano-silica, nano-alumina, nano-zinc oxide, nano-boron, nano-iron oxide or combinations thereof. Another feature of present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. Nos. 5,518,996 and 7,213,646, the relevant portions of which are incorporated herein by reference.

To facilitate a better understanding of the present technique, the following examples of some specific embodiments are given. In no way should the following examples be read to limit, or to define, the scope of the invention.

EXAMPLE 1

Five different cement slurries (i.e., Slurries 1-5) were prepared. The slurries and resulting set cements were then tested to determine setting or thickening times and other physical properties of each of the five different slurries. As set forth below, the respective test results for the five different slurries demonstrate that inclusion of particulate nano-silica in the slurry reduces the set time and increases the strength of the resulting cement relative to cements resulting from inclusion of the other silica components that were tested.

Slurries 1-4 were prepared by dry blending dry components with cement prior to adding water to form the respective slurry. Slurry 5 was prepared by dry blending dry components with cement prior to adding water and then adding colloidal silica to form the respective slurry. Further, each of the five slurries included a different type of silica. The slurries included particulate nano-silica, colloidal silica and micro-silica. While the silica included in each of the five slurries was different, the other components utilized in each of the five slurries were similar. Specifically, in addition to a specific type of silica, each of the five slurries included 100% bwoc of Class G cement, 0.5% bwoc of a retarder, and sufficient water to make the density of the slurry approximately 12 ppg. The specific retarder utilized in the slurries was HR-5 cement retarder, which is a sulfomethylated lignosulfonate. It should be noted that HR-5 cement retarder is available from Halliburton Energy Services, Inc. and is described in U.S. Pat. No. RE31,190.

As set forth above, each of the five slurries included a different type of silica and sufficient water to make the resulting slurry have a density of 12.00 ppg. Slurries 1 and 2 included particulate nano-silica and 15.36 gallons per sack of water ("gps"). Specifically, Slurry 1 included 15% bwoc of particulate nano-silica having a particle size of approximately 30 nm, and Slurry 2 included particulate nano-silica having a particle size of approximately 10 nm. Slurry 3 included 15% bwoc of SILICALITE cement additive and 15.68 gps of water. SILICALITE (compacted) cement additive, which is available from Halliburton Energy Services, Inc., Duncan, Okla., is an amorphous silica generally sized in a range from about 2.5 microns to about 50 microns. Slurry 4 included 15% bwoc of MICROSAND cement additive and 15.77 gps of water. MICROSAND cement additive, which is available from Halliburton Energy Services, Inc., Duncan, Okla., is a crystalline silica ground to a substantially uniform particle size distribution of approximately 5 to 10 microns. Slurry 5 included 5.12 gps of GASCON 469™ lightweight cement additive and 10.09 gps of water. GASCON 469™ lightweight cement additive is available from Halliburton Energy Services, Inc., Duncan, Okla., and may be defined as colloidal silicic acid suspension containing suspended silicic acid particles generally having a particle size of less than about 20 nm.

After the five slurries were prepared, tests were performed to determine various physical characteristics associated with inclusion of the different silica components in each of the associated cement compositions. One of these tests was performed to measure a thickening time associated with each of the five slurries. Specifically, the thickening time associated with each cement slurry was determined by performing a thickening-time test in accordance with API Recommended Practice 10B-2. The thickening time for each slurry was based on the respective slurry reaching a consistency of 70 Bearden units (Bc) at 80° F. The results of these measurements are set forth for each of the five slurries in Table 1 below.

Additional tests were performed on the cement slurries to determine force resistance properties (e.g., compressive strength, shear-bond strength, and tensile strength) for each of the slurries. Each of the force-resistance property tests was performed on the respective cement slurries at a temperature of 80° F. and after the slurries had set for 72 hours. The force-resistance property tests included nondestructive and destructive ultrasonic strength tests, a compressive-strength test, a shear-bond test, and a tensile-strength test. The nondestructive and destructive ultrasonic analyzer tests were conducted using a UCA ultrasonic cement analyzer to determine a $UCA_{72\ hrs}$ value and a $UCA_{crush}$ value, respectively. The compressive-strength tests and UCA analyzer tests were performed in accordance with API Recommended Practice 10B-2. Further, shear-bond and Brazilian-tensile-strength tests were performed to determine shear strength and tensile strength values, respectively, for the different cement compositions. The shear-bond-strength tests were performed as described in SPE 764 entitled "A Study of Cement Pipe Bonding" by L. G. Carter and G. W. Evans. The Brazilian-tensile-strength tests were performed in accordance with ASTM C496-96. The results of the tests performed on each of the five compositions are shown in Table 1 below.

TABLE 1

Impact of Silica Particle Size and Type on Cement Properties

| Slurry | Silica Type | Thick. Time to 70 Bc (Hr:Min) | $UCA_{72\ hrs}$ (psi) | $UCA_{crush}$ (psi) | Comp. Strength (psi) | Shear-Bond Strength (psi) | Brazilian Tensile Strength (psi) |
|---|---|---|---|---|---|---|---|
| 1 | 30 nm Particulate Silica | 2:43 | 328 | 419 | 428 | 169 | 148.28 |

TABLE 1-continued

Impact of Silica Particle Size and Type on Cement Properties

| Slurry | Silica Type | Thick. Time to 70 Bc (Hr:Min) | UCA$_{72}$ hrs (psi) | UCA$_{crush}$ (psi) | Comp. Strength (psi) | Shear-Bond Strength (psi) | Brazilian Tensile Strength (psi) |
|---|---|---|---|---|---|---|---|
| 2 | 10 nm Particulate Silica | 5:00 | 500 | 481 | 402 | 51 | 14.72 |
| 3 | Amorphous Silica | 14:32 | 266 | 206 | 211 | 98 | 95.5 |
| 4 | Crystalline Silica | 20:00+ | 260 | 285 | 252 | 37.2 | 102.16 |
| 5 | Colloidal Silica | 20:00+ | 225 | 219 | 374 | 42.4 | 84.71 |

EXAMPLE 2

Samples of Slurries 1 and 3-5 discussed above were also tested to determine various additional physical properties associated with the resulting set cements and to confirm relative differences demonstrated above. While different instruments and calibration settings were used in the additional testing of the slurries, the test data indicates that relative differences between the different slurries are similar to those differences illustrated in Example 1. Indeed, as indicated above in Example 1, the respective test results in Example 2 for the five different cements demonstrate that inclusion of particulate nano-silica in the cement composition increases the strength of the resulting cement relative to cements resulting from inclusion of the other silica components that were tested Three samples for each of the three conventional cement slurries (Slurry 3-5) and four samples of Slurry 1 were tested to determine compressive strength, Young's modulus, and Poisson's ratio. The compressive-strength tests were performed in accordance with API Specification 10B-2. It should be noted that the compressive-strength measurements in Example 1 are different than those in Example 2 because different equipment and different calibrations were utilized. However, the relative differences between compressive strengths for each of the five slurries are similar. The Young's modulus and Poisson's ratio were statically determined by means of compression testing using a load frame. The Young's modulus or modulus of elasticity for each sample was obtained by taking a ratio of a simple tension stress applied to each sample to a resulting strain parallel to the tension in that sample. The Poisson's ratio for each sample was determined by calculating a ratio of transverse strain to a corresponding axial strain resulting from uniformly distributed axial stress below a proportional limit of each sample. The values determined for the three samples of each of the five different cement slurries are set forth below in Table 2.

TABLE 2

Impact of Silica Particle Size and Type on Cement Properties

| Slurry | Sample | Silica Type | Comp. Strength (psi) | Young's Modulus | Poisson's Ratio |
|---|---|---|---|---|---|
| 1 | Sample 1 | 30 nm Particulate Silica | 1257 | 2.26E+05 | ** |
| 1 | Sample 2 | 30 nm Particulate Silica | 1189 | 2.12E+05 | 0.109 |
| 1 | Sample 3 | 30 nm Particulate Silica | 1249 | 2.04E+05 | 0.092 |
| 1 | Sample 4 | 30 nm Particulate Silica | 1275 | 2.13E+05 | 0.110 |
| 3 | Sample 1 | Amorphous Silica | 466 | 2.53E+05 | 0.064 |
| 3 | Sample 2 | Amorphous Silica | 483 | 2.38E+05 | 0.064 |
| 3 | Sample 3 | Amorphous Silica | 506 | 2.40E+05 | 0.053 |
| 4 | Sample 1 | Crystalline Silica | 350 | 1.42E+05 | 0.068 |
| 4 | Sample 2 | Crystalline Silica | 397 | 1.50E+05 | 0.063 |
| 4 | Sample 3 | Crystalline Silica | 378 | 1.46E+05 | 0.060 |
| 5 | Sample 1 | Colloidal Silica | 514 | 1.03E+05 | 0.063 |
| 5 | Sample 2 | Colloidal Silica | 598 | 1.15E+05 | 0.072 |
| 5 | Sample 3 | Colloidal Silica7 | 627 | 1.23E+05 | 0.071 |

EXAMPLE 3

This example was performed to analyze the effect of including nano-silica in latex-containing cement compositions. For this example, four different slurries were prepared. The slurries and resulting set cements were then tested to determine their mechanical properties, fluid-loss properties and Theological properties. As set forth below, the respective test results for the four different slurries demonstrate that inclusion of nano-silica in the slurry provides higher early strength development and increased compressive strength without significant impact on the fluid loss control and rheological properties.

Slurries 6-9 were prepared by adding the nano-silica to the water along with the other liquid additives. After combination with the liquid additives, the water was then combined with the cement to form the respective slurry. Each of slurries contained Portland Class H cement, latex in an amount of 1.5 gps, and nano-silica in an amount ranging from 0 gps to 0.15 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount of 0.05 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 to 200 nanometers. The nano-silica had a particle size of 18 nm and was supplied by Bee Chems, India under the trade name CemSyn 401a.

After the four slurries were prepared, tests were performed to determine various physical characteristics associated with inclusion of the nano-silica in each of the associated cement compositions. One of these tests was performed to determine force resistance properties for each of the slurries. An ultrasonic cement analyzer ("UCA") available from FANN Instrument Company, UCA autoclave (controller model 304) was used to determine the compressive strength of the cement composition after twenty-four hours. Additionally, the UCA was also used to determine the time for the cement composition to develop a compressive strength of 500 psi. The UCA tests were performed in accordance with API Recommended Practice 10B-2.

The results of these tests are provided in the table below.

TABLE 3

Effect of Nano-Silica Loading on Development of High-Early Strength and 24-Hour Compressive Strength in Latex-Containing Slurries

| Slurry | Amount of Latex (gps) | Amount of Nano-Silica (gps) | UCA Time for 500 psi (hr:min) | Strength at 24 hrs (psi) |
|---|---|---|---|---|
| 6 | 1.5 | 0 | 23:05 | 690 |
| 7 | 1.5 | 0.064 | 17:15 | 2018 |
| 8 | 1.5 | 0.1 | 14:05 | 2345 |
| 9 | 1.5 | 0.15 | 10:59 | 2559 |

Accordingly, Table 3 illustrates the development of high-early strength and 24-hour compressive strength as the concentration of nano-silica is increased from 0 gps to 0.15 gps. In particular, as compared to slurries without nano-silica, the compressive strength obtained in 24 hours for the slurry containing nano-silica in an amount of 0.15 gps is more than triple. Moreover, the time required for the development of 500 psi is reduced considerably (more than half) as compared to the slurry without nano-silica.

Additional tests were performed on Slurries 6-9 to determine rheology and fluid-loss properties for each of the slurries. Each of the slurries was poured into a pre-heated cell with a 325-mesh screen, and a fluid-loss test was performed for 30 minutes at 1,000 psi and 190° F., in accordance with API Recommended Practice 10B-2. Additionally, the rheological properties of the slurries were also determined using a Fann Model 35 viscometer at 190° F. using a bob and sleeve and spring #1.

The results of these tests are provided in the table below.

TABLE 4

Effect of Nano-Silica on Rheology and Fluid Loss on Latex-Containing Slurries

| Slurry | Amount of Latex (gps) | Amount of Nano-Silica (gps) | Rotational Viscometer (Bob & Sleeve; Spring #1) | | | | | | | 190° F. API Fluid Loss (ml/30 min) |
|---|---|---|---|---|---|---|---|---|---|---|
| | | | 300 | 200 | 100 | 60 | 30 | 6 | 3 | |
| 6 | 1.5 | 0 | 51 | 37 | 22 | 15 | 10 | 5 | 4 | 52 |
| 7 | 1.5 | 0.064 | 60 | 45 | 28 | 20 | 13 | 6 | 4 | 41 |
| 8 | 1.5 | 0.1 | 58 | 44 | 27 | 19 | 14 | 6 | 4 | 52 |
| 9 | 1.5 | 0.15 | 61 | 49 | 30 | 24 | 19 | 9 | 6 | 52 |

Accordingly, Table 4 illustrates that even though enhancement of high-early strength and compressive strength was observed by the addition of nano-silica, the fluid-loss and rheological properties of the latex-containing slurries were not significantly affected.

EXAMPLE 4

This example was performed to analyze the effect of latex concentration on the compressive strength of slurries containing nano-silica. For this example, four different slurries were prepared. The slurries and resulting set cements were then tested to determine their mechanical properties. As set forth below, the respective test results for the four different slurries demonstrate that improved properties from inclusion of nano-silica hold for differing amounts of latex.

Slurries 10-13 were prepared by adding the nano-silica to the water along with the other liquid additives. After combination with the liquid additives, the water was then combined with the cement to form the respective slurry. Each of slurries contained Portland Class H cement, latex in an amount ranging from 1 gps to 2 gps, and nano-silica in an amount of either 0 gps or 0.3 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount of 0.05 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 to 200 nanometers. The nano-silica had a particle size of 18 nm and was supplied by Bee Chems, India under the trade name CemSyn 401a.

After the four slurries were prepared, tests were performed to determine various physical characteristics associated with varying the amount of latex on slurries containing nano-silica. One of these tests was performed to determine force resistance properties for each of the slurries. The UCA was used to determine the compressive strength of the cement composition after twenty-four hours. Additionally, the UCA was also used to determine the time for the cement composition to develop a compressive strength of 500 psi. The UCA tests were performed in accordance with API Recommended Practice 10B-2.

The results of these tests are provided in the table below.

TABLE 5

Effect of Latex Concentration on Compressive Strength of Slurries Containing Nano-Silica

| Slurry | Amount of Latex (gps) | Amount of Nano-Silica (gps) | UCA Time for 500 psi (hr:min) | Strength at 24 hrs (psi) |
|---|---|---|---|---|
| 10 | 1 | 0 | 19:52 | 1417 |
| 11 | 1 | 0.3 | 8:11 | 2959 |
| 12 | 1.5 | 0.3 | 8:10 | 2436 |
| 13 | 2 | 0.3 | 7:55 | 2296 |

Accordingly, Table 5 illustrates that the effect of nano-silica on the slurries holds for varying amounts of latex, in that it generally gives more rapid strength development and 24-hour compressive strength irrespective of latex concentration compared to the slurry without nano-silica.

EXAMPLE 5

This example was performed to analyze the influence of set retarders on slurries containing latex and nano-silica. For this example, five different slurries were prepared. The slurries and resulting set cements were then tested to determine their thickening times and rate of strength development. As set forth below, the respective test results for the five different slurries demonstrate that slurries containing latex and nano-silica are sensitive to retarder concentration.

Slurries 14-18 were prepared by adding the nano-silica and set retarder to the water along with the other liquid additives. After combination with the liquid additives, the water was then combined with the cement to form the respective slurry. Each of slurries contained Portland Class H cement, latex in an amount of 1 gps and nano-silica in an amount of either 0 gps or 0.2 gps. Additional additives present in each slurry were D-AIR 3000L™ defoamer in an amount of 0.05 gps, Stabilizer 434B™ latex stabilizer in an amount of 0.2 gps, HR®-6L cement set retarder in an amount ranging from 0.05 gps to 0.15 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 to 200 nanometers. The nano-silica had a particle size of 6 nm and was supplied by Bee Chems, India under the trade name CEMSyn LP. The set retarder used in the slurries was HR-6L, available from Halliburton Energy Services, Inc.

After the five slurries were prepared, tests were performed to determine various physical characteristics associated with varying the amount of set retarder in slurries containing latex and nano-silica. One of these tests was performed to determine a thickening time associated with each of the five slurries. Specifically, the total thickening time for each slurry was determined by performing a thickening-time test in accordance with API Recommended Practice 10B-2. The measurement of thickening time for each slurry was based on the respective slurry reaching a consistency of 100 Bearden units (Bc) at 190° F. In addition, the fluid-loss properties for each slurry were also determined. Each of the slurries was poured into a pre-heated cell with a 325-mesh screen, and a fluid-loss test was performed for 30 minutes at 1,000 psi and 190° F., in accordance with API Recommended Practice 10B-2.

The results of these tests are provided in the table below.

TABLE 6

Influence of Retarder Concentration on Thickening Time and Fluid Loss of Slurries Containing Latex and Nano-Silica

| Slurry | Amount of Latex (gps) | Amount of Nano-Silica (gps) | Amount of Retarder (gps) | Thickening Time (hr:min) | 190° F. API Fluid Loss (ml/30 min) |
|---|---|---|---|---|---|
| 14 | 1.5 | 0 | 0.05 | 6:05 | 54 |
| 15 | 1.5 | 0 | 0.1 | 10:25 | 56 |
| 16 | 1.5 | 0.2 | 0.05 | 2:27 | 34 |
| 17 | 1.5 | 0.2 | 0.1 | 7:24 | 30 |
| 18 | 1.5 | 0.2 | 0.15 | 10:36 | 28 |

Accordingly, Table 6 illustrates that the slurries containing latex and nano-silica are sensitive to set-retarder concentrations, allowing potential adjustment of pump times by varying retarder concentration.

EXAMPLE 6

This example was performed to analyze the influence of nano-silica particle size on properties of latex-containing slurries. For this example, four different slurries were prepared. The slurries were then tested to determine their mechanical and fluid-loss properties. As set forth below, the respective test results for the four different slurries demonstrate that particle size of the nano-silica plays a role in the properties of the latex-containing slurries.

Slurries 19-22 were prepared by adding the liquid additives to water, followed by combination of the water with the cement to form the respective slurry. Dry additives, if any, were dry blended with the cement prior to combination with the water. Each of slurries contained Portland Class H cement, latex in an amount of 1.5 gps, and nano-silica in an amount of 0.3 bwoc. Additional additives present in each slurry were D-AIR 3000L™ defoamer in an amount of 0.05 gps, Stabilizer 434B™ latex stabilizer in an amount of 0.2 gps, HR®-6L cement set retarder in an amount of 0.05 gps, and CFR-3L™ dispersant in an amount of 0.143 gps. Sufficient water was included in the slurries to provide a density of 16.4 ppg. The latex included in the slurries was Latex 2000™ cement additive having a particle size ranging from 150 to 200 nanometers. No nano-silica was included in slurry 19. The nano-silica included in slurry 20 had a particle size of 6 nm and was supplied by Bee Chems, India under the trade name CemSyn LP. The nano-silica included in slurry 21 had a particle size of 13 nm and was supplied by Bee Chems, India under the tradename CemSyn 301a. The nano-silica included in slurry 22 had a particle size of 18 nm was supplied by Bee Chems, India under the trade name CemSyn 401a.

After the four slurries were prepared, tests were performed to determine various physical characteristics associated with varying the particle size of the nano-silica. One of these tests was performed to determine force resistance properties for each of the slurries. The UCA was used to determine the compressive strength of the cement composition after twenty four hours. Additionally, the UCA was also used to determine the time for the cement composition to develop a compressive strength of 500 psi. The UCA tests were performed in accordance with API Recommended Practice 10B-2. Furthermore, each of the slurries was poured into a pre-heated cell with a 325-mesh screen, and a fluid-loss test was performed for 30 minutes at 1,000 psi and 190° F., in accordance with API Recommended Practice 10B-2.

The results of these tests are provided in the table below.

TABLE 7

Influence of Nano-Silica Particle Size on Latex-Containing Slurries

| Slurry | Latex (gps) | Nano-Silica Particle Size | Amount of Nano-Silica Amount (gps) | 190° F. API Fluid Loss (ml/30 min) | UCA Time for 500 psi (hr:min) | UCA Strength at 24 hrs (psi) |
|---|---|---|---|---|---|---|
| 19 | 1.5 | n/a | 0 | 52 | 23:05 | 690 |
| 20 | 1.5 | 6 | 0.2 | 34 | 13:29 | 2203 |
| 21 | 1.5 | 13 | 0.092 | 39 | 15:40 | 2102 |
| 22 | 1.5 | 18 | 0.064 | 41 | 17:15 | 2018 |

Accordingly, Table 7 illustrates that the particle size of the nano-silica impacts properties of the latex-containing slurries. In particular, decreasing the size of the nano-silica from 18 nm to 6 nm resulted in more rapid strength development. In addition, changing the size of the nano-silica also resulted in some improvement in fluid-loss properties.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing in a subterranean formation:
   introducing a cement composition into the subterranean formation, wherein the cement composition comprises cement, a nano-particle essentially free of silica fume, latex, and water; and
   allowing the cement composition to set in the subterranean formation.

2. The method of claim 1 wherein the cement comprises at least one hydraulic cement selected from the group consisting of a Portland cement, a pozzolana cement, a gypsum cement, a high-alumina-content cement, a slag cement, a silica cement, and combinations thereof.

3. The method of claim 1 wherein the cement is essentially free of calcined serpentine.

4. The method of claim 1 wherein the nano-particle comprises at least one nano-particle selected from the group consisting of nano-silica, nano-alumina, nano-zinc oxide, nano-boron, nano-iron oxide, nano-calcium carbonate, nano-clay, and combinations thereof.

5. The method of claim 1 wherein the nano-particle comprises nano-silica.

6. The method of claim 1 wherein the nano-particle comprises colloidal silica.

7. The method of claim 1 wherein the nano-particle has a particle size in the range of about 5 nm to about 50 nm.

8. The method of claim 1 wherein the nano-particle is present in the cement composition in an amount of about 0.01% to about 10% by weight of the cement on a dry basis.

9. The method of claim 1 wherein the latex comprises at least one rubber material selected from the group consisting of natural rubber, modified natural rubber, synthetic rubber, and combinations thereof.

10. The method of claim 1 wherein the latex comprises at least one synthetic rubber material selected from the group an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, an AMPS-styrene-butadiene rubber, and combinations thereof.

11. The method of claim 1 wherein the latex comprises a water-in-oil emulsion that comprises styrene-butadiene rubber.

12. The method of claim 1 wherein the latex comprises an AMPS-styrene-butadiene rubber.

13. The method of claim 1 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and a combination thereof.

14. The method of claim 1 wherein a total amount of silica in the cement composition is about 25% or less by weight of the hydraulic cement on a dry basis.

15. The method of claim 1 wherein introducing the cement composition into the subterranean formation comprises introducing the cement composition into a space between a pipe string and a wall of a well bore that penetrates the subterranean formation.

16. The method of claim 1 comprising introducing the pipe string into the well bore.

17. The method of claim 1 wherein the cement composition further comprises at least one additive selected from the group consisting of crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, and a combination thereof.

18. The method of claim 1 wherein the nano-silica is present in an amount in the range of about 0.01% to about 4% by weight of the cement on a dry basis.

19. A method of cementing in a subterranean formation:
   introducing a cement composition into a space between the subterranean formation and a conduit disposed in the subterranean formation, wherein the cement composition comprises cement, nano-silica, latex, and water, wherein the nano-silica has a particle size in the range of about 1 nm to about 100 nm, and wherein the nano-silica is present in an amount in the range of about 0.01% to about 4% by weight of the cement on a dry basis, latex, and water; and allowing the cement composition to set in the space.

20. The method of claim 19 wherein the nano-silica comprises colloidal silica.

21. The method of claim 19 wherein the nano-silica has a particle size in the range of about 5 nm to about 50 nm.

22. The method of claim 19 wherein the latex comprises an AMPS-styrene-butadiene rubber.

23. The method of claim 19 wherein the latex comprises a water-in-oil emulsion that comprises styrene-butadiene rubber.

24. The method of claim 19 wherein the nano-silica is essentially free of silica fume.

25. The method of claim 19 wherein the cement composition further comprises at least one additive selected from the group consisting of crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, and a combination thereof.

26. A method of cementing in a subterranean formation:
preparing a cement composition using encapsulated nano-particles, wherein at least a portion of the nano-particles are released;
introducing the cement composition into the subterranean formation; and
allowing the cement composition to set in the subterranean formation.

27. The method of claim 26 wherein the encapsulated nano-particles comprises at least one nano-particle selected from the group consisting of nano-silica, nano-alumina, nano-zinc oxide, nano-boron, nano-iron oxide, nano-calcium carbonate, nano-clay, and combinations thereof.

28. The method of claim 26 wherein the encapsulated nano-particles comprise nano-silica.

29. The method of claim 26 wherein the encapsulated nano-particles are encapsulated in a degradable material.

30. The method of claim 26 wherein the encapsulated nano-particles are essentially free of silica fume.

31. The method of claim 26 wherein the encapsulated nano-particles comprise a nano-particle having a particle size in the range of about 5 nm to about 50 nm.

32. The method of claim 26 wherein the encapsulated nano-particles are present in the cement composition in an amount of about 0.01% to about 4% by weight of the cement on a dry basis.

33. The method of claim 26 wherein the latex comprises at least one synthetic rubber material selected from the group an ethylene-propylene rubber, a styrene-butadiene rubber, a nitrile rubber, a nitrile butadiene rubber, a butyl rubber, a neoprene rubber, a polybutadiene rubber, an acrylonitrile-styrene-butadiene rubber, a polyisoprene rubber, an AMPS-styrene-butadiene rubber, and combinations thereof.

34. The method of claim 26 wherein the latex comprises an AMPS-styrene-butadiene rubber.

35. The method of claim 26 wherein the cement composition further comprises at least one additive selected from the group consisting of a latex stabilizer, a strength-retrogression additive, a set accelerator, a set retarder, a weighting agent, a lightweight additive, a gas-generating additive, a mechanical property enhancing additive, a lost-circulation material, a filtration-control additive, a fluid loss control additive, a dispersant, a defoaming agent, a foaming agent, a thixotropic additive, and a combination thereof.

36. The method of claim 26 wherein the cement composition further comprises at least one additive selected from the group consisting of crystalline silica, amorphous silica, fumed silica, a salt, fiber, a hydratable clay, calcined shale, vitrified shale, a microsphere, fly ash, slag, diatomaceous earth, metakaolin, rice husk ash, natural pozzolan, zeolite, cement kiln dust, lime, an elastomer, a resin, latex, a combination thereof.

* * * * *